US008120755B2

(12) United States Patent
Wieneke

(10) Patent No.: US 8,120,755 B2
(45) Date of Patent: Feb. 21, 2012

(54) METHOD OF CORRECTING A VOLUME IMAGING EQUATION FOR MORE ACCURATE DETERMINATION OF A VELOCITY FIELD OF PARTICLES IN A VOLUME

(75) Inventor: Bernhard Wieneke, Göttingen (DE)

(73) Assignee: LaVision GmbH, Gottingen (DE)

( * ) Notice: Subject to any disclaimer, the term of this patent is extended or adjusted under 35 U.S.C. 154(b) by 1089 days.

(21) Appl. No.: 11/904,433

(22) Filed: Sep. 27, 2007

(65) Prior Publication Data

US 2008/0123939 A1    May 29, 2008

(30) Foreign Application Priority Data

Nov. 25, 2006    (DE) .......................... 10 2006 055 746

(51) Int. Cl.
*G01B 11/26*    (2006.01)
(52) U.S. Cl. .......................... 356/28; 356/3.01; 356/5.01
(58) Field of Classification Search .................... 356/28, 356/3.01–3.15, 4.01–4.1, 5.01–5.15, 6–22, 356/28.5
See application file for complete search history.

(56) References Cited

U.S. PATENT DOCUMENTS 5,883,707 A    3/1999    Arndt et al.
(Continued)

FOREIGN PATENT DOCUMENTS

DE        198 01 615 A1    7/1999
(Continued)

OTHER PUBLICATIONS

Wieneke B: "Stereo-PIV using self calibration on particle images" Experiments in Fluids; Experimental Methods and Their Applications to Fluid Flow, Springer-Verlag, BE, Bd. 39, Nr. 2, Aug. 1, 2005, pp. 267-280 Louhichi Hanene et al: "Camera self-calibration in scheimpflug condition for air flow ISSN: 1432-1114, p. 267, p. 271, p. 279 investigation" Lec. Notes Compt. (Including Suseries Lecture Notes in Artificial Intelligence and Lecture Notes in Bioinformatics); Advance in Visual Computing—Second International Symposium, ISVC 2006, Proceedings 2006, Bd. 4292 Lncs—II, Nov. 6, 2006, Nov. 8, 2006, pp. 891-900, XP002468296, the whole document.

(Continued)

*Primary Examiner* — Thomas Tarcza
*Assistant Examiner* — Luke Ratcliffe
(74) *Attorney, Agent, or Firm* — Thomas R. Vigil

(57) ABSTRACT

The subject matter of the invention is a method of correcting a volume imaging equation for more accurate determination of a velocity field of particles in a volume, said volume being captured from different directions by at least two cameras, a coarse calibration of the position of the cameras relative to each other and relative to the volume of concern being carried out first by determining an imaging equation that associates with the coordinates (X, Y, Z) of a point in the volume the corresponding camera picture coordinates $x_i$, $y_i$ of each camera i, all the cameras then capturing simultaneously in the same unchanged position particles in a volume, the position (X, Y, Z) of a particle in the volume being approximated by means of a known triangulation method using the calculated position $x_i$, $y_i$ of a particle in the camera pictures, this position (X, Y, Z) being imaged through the original imaging equation onto a position $x_i'$, $y_i'$ in the camera images of the at least two cameras, a correction factor for the imaging equation being calculated from the difference ($dx_i$, $dy_i$) between the coordinates ($x_i$, $y_i$) and ($x_i'$, $y_i'$) so that, thanks to the amended imaging equation, the point ($x_i$, $y_i$) becomes identical with the point ($x_i'$, $y_i'$) for all the cameras i, this correction occurring for many particles in the volume.

5 Claims, 2 Drawing Sheets

U.S. PATENT DOCUMENTS

| | | | |
|---|---|---|---|
| 5,905,568 A | 5/1999 | McDowell et al. | |
| 2005/0062954 A1* | 3/2005 | Wieneke | 356/28 |

FOREIGN PATENT DOCUMENTS

| | | |
|---|---|---|
| DE | 199 28 698 A1 | 9/2000 |
| DE | 103 12 696 B3 | 12/2004 |
| DE | 103 43 160 B3 | 5/2005 |

OTHER PUBLICATIONS

Cao et al: "Self-calibration from turn-table sequences in presence of zoom and focus" Computer Vision and Image Unterstanding, Academic Press, San Diego, CA, US, Bd. 102, Nr. 3 Jun. 2006, pp. 227-237, ISSN: 1077-3142, section 4.3.2.

Stolkin R et al: "Video with Ground-Truth 1-5 for Validation of Visual Registration, Tracking and Navigation Algorithms" Computer and Robot Vision, 2005. Proceedings. The $2^{nd}$ Canading Conference on Victoria, BC, Canada May 9-11, 2005, Piscataway, NJ, USA, IEEE, May 9, 2005, pp. 210-217, ISBN: 0-7695-2319-6, section 2.3.5.

Skrypnyk I et al: "Scene Modelling Recognition and Tracking with Invariant Image Features" Mixed and Argumented Reality, 2004. ISMAR 2004. Third IEEE and ACM International Symposium on Arlington, VA, USA Nov. 2-5, 2004, Piscataway, NJ, USA, IEEE, Nov. 2, 2004, pp. 110-119, XP010769634, ISBN: 0-7695-2191-6, section 3.2.

Trainagulation—Wikpedia.

Triangulation, Nov. 1997.

Multiple View Geometry . . . , Mar. 2004.

* cited by examiner

METHOD OF CORRECTING A VOLUME IMAGING EQUATION FOR MORE ACCURATE DETERMINATION OF A VELOCITY FIELD OF PARTICLES IN A VOLUME

This application claims Priority from German Application No. DE 10 2006 055 746.8 filed on 25 Nov. 2006

1. FIELD OF THE INVENTION

The present invention relates to a method of correcting a volume imaging equation for more accurate determination of a velocity field of particles in a volume.

2. DESCRIPTION OF THE PRIOR ART

A standard method of measuring velocities in gases or liquids is provided by what is termed the Particle Image Velocimetry (PIV) Method (DE 199 28 698 A1) by which small particles are added to the flow and a thin observation plane is usually illuminated twice in short intervals by a laser and is captured by a camera that is positioned at right angles to the observation plane. This camera is capable of taking two pictures in fast sequence. These camera pictures are divided into small interrogation windows and these two interrogation windows are cross-correlated with the two capture times at a location x, y in order to determine, through the highest correlation peak, the most probable displacement vector dx, dy between the two interrogation windows. With such a camera, one obtains a two-dimensional velocity field with the corresponding velocity components within the illumination plane. A second camera serves to additionally determine the third velocity component at right angles to the light sheet plane by means of stereoscopic computation (Stereo-PIV).

In order to now measure a velocity field not only in a plane, but rather in a volume, various methods have further been developed. A light sheet may e.g., be displaced quickly through a volume, for example with the help of a rotating mirror, and several planes can be captured in fast sequence using a correspondingly fast camera.

Alternatively, several planes can be illuminated in short sequence and one camera may be provided for every single plane, this being described in U.S. Pat. No. 5,883,707 A1.

Another method relies on capturing a complete volume with two or more cameras simultaneously (U.S. Pat. No. 5,905,568). The observed particles are localized in each camera picture and the (X, Y, Z) position of the particles is determined by triangulation. A particle in a picture 1 lies along an epipolar line as a function of the depth z in the camera picture 2. From the position at different times, the velocity of the particles is determined using a particle matching and tracking algorithm (3D PTV=3D-Particle-Tracking-Velocimetry). Like in the stereo PIV, it is also necessary to carry out an accurate volume calibration of the cameras. The disadvantage of this method is that the particle density must be quite low since overlapping particles lead to errors and too many potential particles lie on the epipolar lines during triangulation, thus leading to non-existing phantom particles.

A method of determining a three-dimensional velocity, field in a volume is further known from the document DE 103 43 160.8 A1 (tomographic PIV), the particles located in the volume radiating by illuminating the volume. There are further provided at least two cameras that take a picture simultaneously at two different times $t_1$, $t_2$ at least. The same voxel (volume unit) at position (X, Y, Z) is thereby imaged from the volume by imaging equations onto the picture plane to camera points $(x_i, y_i)$ of the at least two cameras. Each camera pixel $(x_i, y_i)$ of camera i is thereby integrating the intensities of all voxel along a line-of-sight. With a suitable tomographic reconstruction algorithm the intensities of all voxel inside the volume are reconstructed for the different times $t_1$ and $t_2$.

The reconstructed volume is then divided into small interrograion volumes of e.g. 64×64×64 voxel. Through three-dimensional cross correlation, the displacement vector $(d_x, d_y, d_z)$ is determined between the two interrogation volumes at the times $t_1$ and $t_2$ so that a complete velocity field is obtained for the observation volume.

This method as well as the 3D particle tracking itself operate very satisfactorily; the only disadvantage is that calibration must be very accurate. In most cases, calibration occurs with the help of a calibration plate that is displaced through the volume. This often results in experimental sources of error, e.g., through inaccurate displacement or through optical distortion. More accurate calibration allows for making more precise statements about the velocity field of particles in a volume.

For all the volume methods, an imaging equation is calculated through volume calibration, a function $(x_i, y_i)=M_i(X, Y, Z)$ relating a point in space X, Y, Z on the picture coordinates $x_i, y_i$ of the $i^{th}$ camera. In practice, a perspective camera aperture plate model with suited distortion coefficients is often used [Hartley and Zisserman, Multiple View Geometry, Cambridge University Press, 2000, ISBN 05216230349]. For determining the imaging equation, the reader is referred to the document DE 103 12 698 B3.

Another possibility for forming the imaging function M (X, Y, Z) consists in using a polynomial function of the third degree in the spatial coordinates X, Y, Z [Soloff S M, Adrian R J, Liu Z C (1997) Distortion Compensation for Generalized Stereoscopic Particle Image Velocimetry, Meas Sci Technol 8:1441-1454].

BRIEF SUMMARY OF THE INVENTION

A method of correcting a volume imaging equation for more accurate determination of a velocity field of particles in a volume, and, as a result thereof, a more precise calibration method, is characterized, in accordance with the invention, in that the volume is captured from different directions by at least two cameras, a coarse calibration of the position of the cameras relative to each other and relative to the volume of concern being carried out first by determining an imaging equation that associates with the coordinates (X, Y, Z) of a point in the volume the corresponding camera picture coordinates $x_i, y_i$ of each camera i, all the cameras then capturing simultaneously in the same unchanged position particles in a volume, the position (X, Y, Z) of a particle in the volume being approximated by means of a known triangulation method using the calculated position $x_i, y_i$ of a particle in the camera pictures, this position (X, Y, Z) being imaged through the original imaging equation onto a position $x_i', y_i'$ in the camera images of the at least two cameras, a correction factor for the imaging equation being calculated from the difference $(dx_i, dy_i)$ between the coordinates $(x_i, y_i)$ and $(x_i', y_i')$ so that, thanks to the amended imaging equation, the point $(x_i, y_i)$ becomes identical with the point $(x_i', y_i')$ for all the cameras i.

This method is performed for many particles in a captured picture, as well as, at need, for many pictures so that the correction factors may be determined with the greatest possible accuracy in the entire volume so that erroneous particle association and other sources of error can be minimized with this method.

The method of the invention may be utilized for any functional form of an imaging equation.

Further advantageous features will become apparent from the dependent claims.

There is more specifically provided that the volume of concern is partially shadowed; this may e.g., occur using an aperture plate, in order to minimize erroneous particle associations.

The claims 4 and 5 describe the possibility to determine the size and orientation of the illuminated volume, using the computed particle positions so that this volume can be oriented along a coordinate axis in the x, y or z direction by means of a suited coordinate transformation (rotation and translation).

The invention will be explained in greater detail herein after with the help of the two drawings.

DETAILED DESCRIPTION OF THE INVENTION

Figure 1:
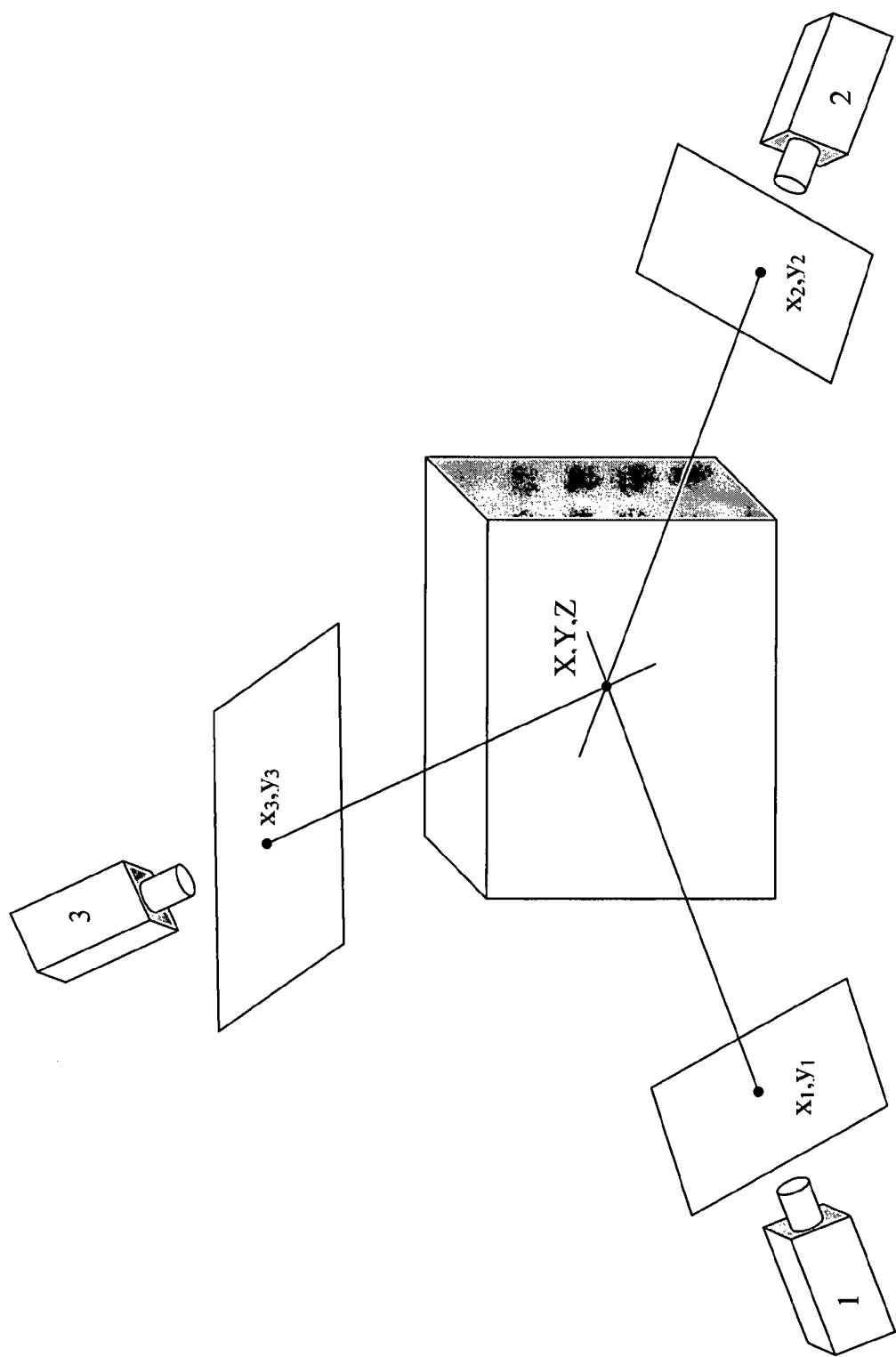
FIG. 1 shows the ideal case with accurate calibration in which the three visual rays of the three cameras meet exactly in one point. It is thereby assumed that a particle in a spatial position X, Y, Z is imaged by an imaging equation $M_1$ (X, Y, Z) determined by calibration in a position $(x_1, y_1)$ in the picture of camera 1, likewise in a position $(x_2, y_2)$ of camera 2 and $(x_3, y_3)$ of camera 3, with imaging equations $M_2$ and $M_3$. Conversely, the position of the particle X, Y, Z in space can be determined from the measured particle positions $(x_i, y_i)$ on the pictures of the cameras 1 through 3 by triangulation, i.e., by tracing the visual rays back through space, all three visual rays meeting exactly in the spatial point X, Y, Z. This only applies however if the imaging equations $M_i$ have been determined exactly, meaning without error.
Figure 2:
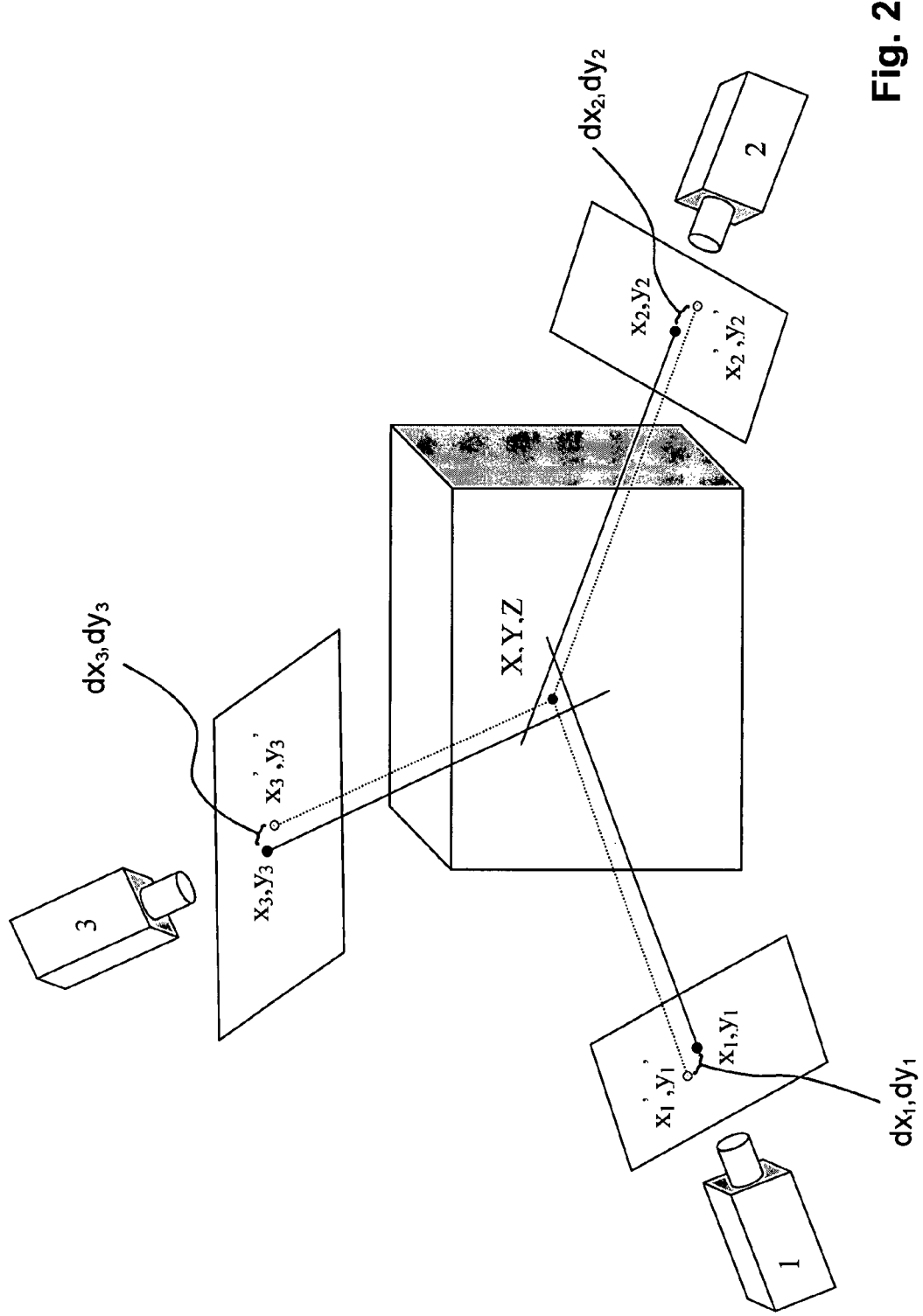
FIG. 2 illustrates the one or less usual case in which the imaging equations determined by calibration are erroneous, i.e., the visual rays of the three cameras do not converge exactly in one point for the same particle. Triangulation yields the best possible point X, Y, Z. This point however does not correspond to the points $(x_i, y_i)$ measured but is rather image back on the differing points $(x'_i, y'_i)=M_i(X, Y, Z)$ through the imaging equations so that, thanks to an amended imaging equation, the point $(x_i, y_i)$ becomes identical with the point $(x'_i, y'_i)$ for all the cameras i.

The method recited in the claims relies on correcting the imaging equations $M_i$ using the differences $(dx_i, dy_i)=(x_i, y_i)-(x'_i, y'_i)$ (FIG. 2) in such manner that the visual rays again intersect in one point, i.e., that $(x_i, y_i)$ becomes identical with the points $(x'_i, y'_i)$. This occurs for as many particles as are detected in one or several pictures taken in order to correct the imaging equations if possible everywhere in the illuminated volume. Additionally with a robust statistic method such as e.g., RANSAC, erroneous triangulations due to ambiguities occurring in particular with high density can be eliminated. See Wikpedia definition of Triagulation, the article entitled Triangulation by Richard Hartley and Peter Sturm in COMPUTER VISION AND IMAGE UNDERSTANDING, Vol 68, No. 2, November 1997, pp. 146-157, and the book Multiple View Geometry in computer vision by Richard Hartley and Andrew Zisserman published by Cambridge University Press in March 2004 for descriptions of triangulation methods.

A simple correction of the original imaging equation using $dx_i$ and $dy_i$ is as follows and is illustrated here for camera 1: For camera 1, the original imaging equation is given by $(x_1, y_1)=M_1(X, Y, Z)$ for a position in space (X, Y, Z) and by a position $(x_1, y_1)$ computed therefrom in the picture of camera 1. The observation volume is now divided into a fine grid with e.g., 10×10×10 points in X, Y and Z, a correction factor $(dx_1, dy_1)$ being computed for each grid position using the method explained herein above, the correction factors of all the particles found in proximity to this grid position being averaged in a suited manner to a value $dx_1$ and $dy_1$. Then, a corrected imaging equation $M_1$ (X, Y, Z) is computed so that for this function $(x_1, y_1)=(x_1+dx_1, y_1+dy_1)=M_1(X, Y, Z)$, with the greatest possible accuracy for all the grid positions. The fit usually occurs through a nonlinear adaptation method such as Levenberg-Marquardt. A polynomial function of the third degree in X, Y and Z may again be chosen for example for $M_1(X, Y, Z)$ and the nonlinear fit computes the coefficients of this polynomial function and, as a result thereof, the new amended imaging equation for camera 1. This is also carried out for camera 2 and for others.

A mathematically similar method is known from Soloff S M, Adrian R F, Liu Z C . . . (already mentioned), where this method was used for determining optical distortions using a regular calibration plate.

I claim:

1. A method for correcting a volume imaging equation for more accurate determination of a velocity field of particles in a volume, said volume being captured from different directions by at least two cameras, a coarse calibration of the position of the cameras relative to each other and relative to the volume of concern being carried out first by determining an imaging equation that associates with the coordinates (X, Y, Z) of a point in the volume the corresponding camera picture coordinates $x_i$, $y_i$, of each camera i, all the cameras then capturing simultaneously in the same unchanged position particles in a volume, the position (X, Y, Z) of a particle in the volume being approximated by means of a known triangulation method using the calculated position $x_i$, $y_i$, of a particle in the camera pictures, this position (X, Y, Z) being imaged through the original imaging equation onto a position in the camera images of the at least two cameras, a correction factor for the imaging equation being calculated from the difference $(dx_i',dy_i')$ between the coordinates $(x_i, y_i)$ and $(x_i', y_i')$ so that, thanks to an amended imaging equation, the point $(x_i, y_i)$ becomes identical with the point $(x_i', y_i')$ M for all the cameras i, this correction occurring for many particles in the volume.

2. The method as set forth in claim 1, characterized in that the method is carried out for particles in several pictures taken, the correction factors being determined with greater accuracy by means of a suited statistic method with erroneous particle associations being minimized.

3. The method as set forth in claim 1, characterized in that the volume of concern is partially shadowed to decrease the number of visible particles.

4. The method as set forth in claim 1, characterized in that the computed particle positions (X, Y, Z) in the volume are utilized to determine orientation and size of the illuminated volume.

5. The method as set forth in claim 4, characterized in that the illuminated volume is oriented along coordinates axes by means of a rotation and translation of the imaging equation of the coordinate system.

* * * * *